Dec. 28, 1926.
C. I. HALL
1,612,114
THERMAL RESPONSIVE CIRCUIT CONTROLLER
Filed May 2, 1921
Fig.1.
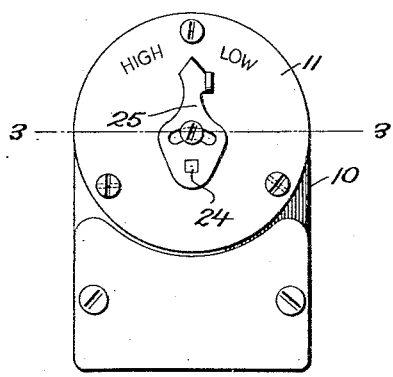
Fig.2.
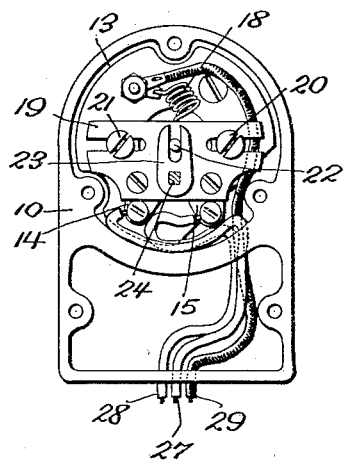
Fig.3.
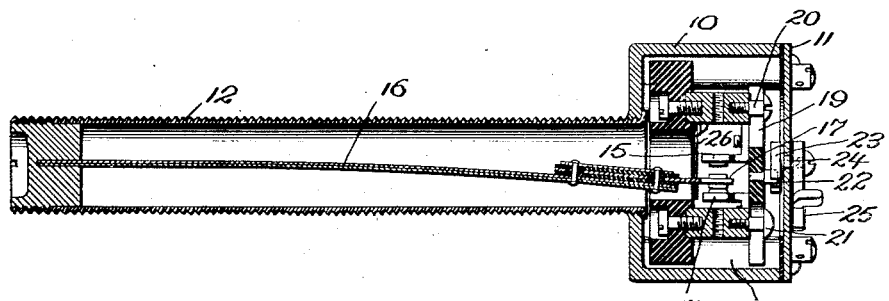
Fig.4.
Fig.5.
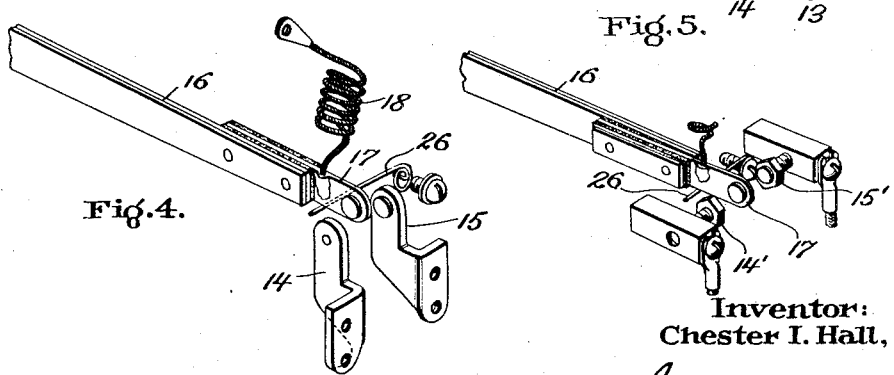
Inventor:
Chester I. Hall,
by *Albert G. Davis*
His Attorney.

Patented Dec. 28, 1926.

1,612,114

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

THERMAL RESPONSIVE CIRCUIT CONTROLLER.

Application filed May 2, 1921. Serial No. 466,333.

My invention relates to improvements in thermal responsive circuit controllers and the invention resides in certain advantageous features of construction and arrangement.

One of the objects of the invention is to provide a thermal responsive circuit controller which shall be enclosed in an hermetically sealed casing with a circuit controlling thermostatic element within a portion of the casing which is arranged to be heated by apparatus under the control of the controller.

Another object of the invention is the provision of a controller of the character specified in which the temperature limits between which the circuit controlling element operates shall be adjustable within the casing, preferably, although not necessarily, from the outside of the casing.

Another object of the invention is the provision of means for temporarily arresting the movement of a thermostatic element between its limits of operation to cause the stored up energy in the element to move the element quickly when the element is permitted to move.

Another object of the invention is to provide means for imparting an intermittent movement in the nature of a step-by-step movement to a thermostatic element instead of permitting the ordinary substantially slow and uniform movement of the element between its limits, thereby giving the equivalent of a quick moving contact at the time the element either engages or disengages one of its oppositely disposed circuit controlling contacts.

A still further object of the invention is to dampen out all vibrations of the thermostatic element due to the "reed" action of the element.

In carrying the invention into effect in one form, I provide a thermal responsive circuit controller having a sealed casing which includes a comparatively long tube which is adapted to be heated. A thermostatic element has one end mounted in one end of the tube and its free end projecting beyond the tube within the casing so as to make engagement with either one of two oppositely disposed circuit controlling contacts. These contacts are adjustable either within or outside of the casing. A spring is adapted to press against the free end of the thermostatic element to dampen out all vibrations of the element due to the "reed" action of the element and to cause the element to move intermittently by a sort of step-by-step motion between its limits of operation.

For a better understanding of the invention, reference is had to the accompanying drawings, in which Fig. 1 is an end view of my improved thermal responsive circuit controller; Fig. 2 is a similar view with the end cover of the casing removed; Fig. 3 is a cross-sectional view along the line 3—3 of Fig. 1; Fig. 4 is a detail of the thermostatic element with its cooperating circuit controlling contacts and the spring for cooperating with the element for the purpose specified; and Fig. 5 is a similar detail showing the manner in which the circuit controlling contacts can be made adjustable from the inside of the casing.

Referring to the drawings, the thermal responsive circuit controller comprises an hermetically sealed casing 10 having a cover 11 which is removably secured to the casing with a sealing washer between the cover and the casing for the purpose of securing a substantially air tight joint. The casing 10 includes a comparatively long corrugated tube 12 which is sealed at its left hand end by means of a plug as shown and which communicates with the enlarged chamber 13 within which the circuit controlling contacts 14 and 15 are located. A bi-metallic thermostatic element is mounted within the long corrugated tube 12, and one end of the element is secured to the plug in the left hand end of the tube and the free end of the element projects beyond the tube within the chamber 13. The free end of the tube carries an insulated circuit controlling contact 17 which is secured to one of the terminals of the device by means of the coiled conductor 18. The tube 12 is corrugated throughout its length for the purpose of obtaining a greater surface to be heated, and this surface is preferably blackened in order to increase the interchange of heat between the material surrounding the tube and the thermostatic element. One use for my invention is found in the control of the temperature of the circulating brine of a refrigerating equipment, and when used for this purpose the tube 12 will be immersed in the brine, the temperature of which is electrically controlled by means of my improved controller.

The thermostatic element 16 is adapted to bend under the influence of a change of temperature and thereby carry the insulated contact 17 into engagement with either one or the other of the circuit controlling contacts 14 and 15. As shown in Figs. 2, 3 and 4, these circuit controlling contacts are mounted in a support 19 which may be shifted back and forth along the line of movement of the contact 17 on the free end of the thermostatic element. The member 19 is supported in position by means of the screws 20 and 21, and the arrangement is such that a certain freedom of movement of the member 19 is permitted with respect to these screws. The member 19 is provided with a pin 22 which cooperates with the slotted arm of a pivoted member 23 which is mounted on a short shaft 24 extending through the cover 11. An indicating pointer 25 is mounted on the shaft 24 on the outside of the casing, and the arrangement is such that when the pointer is turned to the right the member 19 carrying the movable contacts 14 and 15 is also shifted to the right and the contacts are thereby shifted to a new position, in this case to a position at which a comparatively low temperature is automatically maintained. When the indicator is rotated counter-clockwise, the contacts 14 and 15 are simultaneously shifted to another position, at which the thermal responsive element 16 functions to automatically maintain a higher temperature of the brine surrounding the corrugated tube 12.

The wire 26, having its right hand end coiled so as to form a spring, is mounted within the chamber 13 so as to press on the lower edge of the insulated contact 17 mounted on the free end of the thermostatic element 16. This spring friction device sets up sufficient friction to prevent vibrations of the thermostatic element due to the "reed" action of the element, and it also temporarily arrests the movement of the element so that when the stored up force in the element overcomes the friction, the element is moved quickly until again arrested by the friction effect.

As thus constructed and arranged, the operation of my invention is as follows:—Assume that the corrugated tube 12 is mounted so as to project within a chamber having brine or any other fluid or material, the temperature of which is to be automatically maintained, that the conductors 27 and 28 are connected so as to control an electric motor driving a brine circulating pump or the like, and that the conductor 29 is connected to one side of a supply circuit. It will be understood by those skilled in the art that my thermal responsive circuit controller may be used to either directly control an electric motor or other device which controls the temperature of the material surrounding the tube 12, or my controller may be used as a relay in what is known in the art as a remote control system; that is, one in which the controller does not itself carry the main operating current, but merely controls the current for energizing electromagnetic devices which themselves control the main line current. If a low heat is desired to be maintained, the indicator 25 will be turned clockwise to the proper position, thereby shifting the contacts 14 and 15 to the desired position, and the thermostatic element 16 will oscillate between the contacts 14 and 15 to thereby alternately energize the conductors 27 and 28 respectively. When the contact 17 carried by the free end of the thermostatic element makes engagement with the contact 14, for example, a circuit is completed through the conductor 29, the coiled conductor 18, the movable contact 17, and the contact 14. If the device controls an electric motor, the motor will be energized to operate in one direction. When the movable contact 17 makes engagement with the relatively stationary contact 15, the motor will be energized for operation in the reverse direction, and the result will be that the motor or other device controlled by the thermal responsive circuit controller will operate to maintain a temperature surrounding the corrugated tube 12 which is between the limits determined by the setting of the contacts 14 and 15.

The free end of the thermostatic element 16 would ordinarily move smoothly and gradually with a substantially constant movement between its limits of operation. This is ordinarily undesirable, for the reason that the contact 17 carried by this free end of the thermostatic element is apt to make only a very slight contact with either one of the contacts 14 or 15, and thereby cause burning of the contacts due either to the low contact pressure or to arcing. In order to prevent this, and also to prevent vibrations of the thermostatic element due to the "read" action of the element, I have provided the friction wire 26. This sets up friction between the free end of the thermostatic element and the wire sufficient to dampen out all minor vibrations of the element and also to translate the ordinary movement of the element into a succession of quick intermittent movements which are in the nature of step by step movements. The equivalent of a quick moving contact at the time when the contact points come together and when they separate is thereby obtained, so that the circuits controlled by the device will be quickly made and quickly broken.

In the arrangement of Fig. 5 I have shown a modified form of my invention in which the contacts 14' and 15' are adjustable from the inside of the casing, but not from the outside of the casing. With this arrangement it is necessary to remove the cover 11 of the sealed casing in order to adjust the contacts.

The casing 10 is substantially hermetically sealed in order to provide a dead air space which when the device is in operation is substantially independent of ambient or room temperature, so that the device is operated substantially directly in accordance with the temperature of the material surrounding the corrugated tube 12.

In accordance with the provisions of the patent statutes, I have described the principle of operation of my invention, together with the apparatus which I now consider to represent the best embodiment thereof, but I desire to have it understood that the apparatus is only illustrative and that the invention can be carried out by other means.

What I claim as new and desire to secure by Letters Patent of the United States, is,—

1. The combination in a thermal responsive circuit controller of a thermostatic element normally movable with a continuous movement in response to changes of temperature, a circuit controlling contact mounted upon said element to be operated thereby, and means for changing the said movement of the element into an intermittent movement.

2. The combination in a thermal responsive circuit controller of a thermostatic element normally movable with a continuous movement in response to changes of temperature, a circuit controlling contact mounted upon said element and arranged to be operated thereby between two circuit controlling positions, and means for imparting a step by step motion to the element.

3. The combination in a thermal responsive circuit controller of a thermostatic circuit controlling element normally movable slowly and with a continuous motion between limits in response to changes of temperature, and means cooperating with the element for translating the movement of the element between its limits into a succession of quick movements.

4. The combination in a thermal responsive circuit controller of a thermostatic circuit controlling element fixed at one end with its free end normally movable between two circuit closing positions with a continuous movement in response to changes of temperature, and a friction device cooperating with the same for causing the free end of the element to move intermittently.

5. The combination in a thermal responsive circuit controller of a thermostatic element fixed at one end, a contact mounted upon the free end of the element to be operated thereby between predetermined limits, and a friction device cooperating with the free end of the element arranged to dampen vibrations of the element and to cause the element to have an intermittent movement between its limits of movement.

6. The combination in a thermal responsive circuit controller of a thermostatic circuit controlling element fixed at one end, and a spring biased into frictional engagement with the free end of the element for dampening the vibrations of the element and for causing the free end of the element to move intermittently between its limits of movement.

7. A thermal responsive circuit controller comprising a sealed casing including an elongated tube adapted to be heated, a thermostatic element having one end mounted in one end of the said tube and the free end thereof movable within the casing, an insulated contact on the free end of the element, means cooperating with the said contact for causing an intermittent movement of the contact and oppositely disposed adjustable circuit controlling contacts within the said casing adapted to be engaged by the said insulated contact.

8. A thermal responsive circuit controller comprising a sealed casing including a comparatively long corrugated metal tube adapted to be heated and a chamber communicating with one end of the tube, a thermostatic element having one end mounted in the opposite end of the said tube and the free end thereof projecting beyond the tube within the chamber, an insulated contact carried by the free end of the element, a spring cooperating with the free end of the said element for dampening vibrations of the element and for causing the free end of the element to move intermittently between its limits of movement, contacts disposed on opposite sides of said insulated contact mounted in a member adapted to be shifted back and forth within the said chamber in the line of movement of the said insulated contact, a removable cover for the said chamber, a pivoted member having a shaft mounted in the said cover and extending outside the said chamber for shifting the said member carrying the said contacts, and an indicating device mounted on the said shaft outside the said cover for indicating the limits of temperature to be maintained by the controller.

In witness whereof, I have hereunto set my hand this 28 day of April, 1921.

CHESTER I. HALL.